(12) United States Patent
Fowler et al.

(10) Patent No.: US 7,118,171 B2
(45) Date of Patent: Oct. 10, 2006

(54) SEAT ASSEMBLY WITH FOLDING HEAD RESTRAINT AND METHOD FOR FOLDING SAME

(75) Inventors: Thomas J. Fowler, Clarkston, MI (US); Nagarjun Yetukuri, Rochester Hills, MI (US); Dale Smallwood, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/839,622

(22) Filed: May 5, 2004

(65) Prior Publication Data

US 2005/0248198 A1    Nov. 10, 2005

(51) Int. Cl.
*A47C 1/02* (2006.01)
(52) U.S. Cl. ........................................... 297/61
(58) Field of Classification Search .................. 297/61, 297/378.1, 391, 408, 216.12, 403, 406, 407, 297/410
See application file for complete search history.

(56) References Cited

U.S. PATENT DOCUMENTS

| | | | |
|---|---|---|---|
| 147,161 A * | 2/1874 | Peirsol ........................ 297/100 |
| 344,726 A * | 6/1886 | Dolton ........................ 297/403 |
| 449,419 A * | 3/1891 | Hutton et al. .......... 297/354.13 |
| 866,753 A * | 9/1907 | Weber ........................ 297/405 |
| 2,705,994 A * | 4/1955 | Stattler ........................ 297/105 |
| 3,065,029 A | 11/1962 | Spound et al. |
| 3,174,799 A | 3/1965 | Haltenberger |
| 4,623,166 A | 11/1986 | Andres et al. |
| 4,923,250 A * | 5/1990 | Hattori ........................ 297/410 |
| 5,145,233 A * | 9/1992 | Nagashima ................. 297/408 |
| 5,181,758 A | 1/1993 | Sandvik |
| 5,681,079 A | 10/1997 | Robinson |
| 5,738,411 A | 4/1998 | Sutton et al. |
| 5,752,742 A * | 5/1998 | Kerner et al. ............... 297/391 |
| 5,984,397 A | 11/1999 | Dawson et al. |
| 6,050,633 A | 4/2000 | Droual |
| 6,663,181 B1 | 12/2003 | Nygren et al. |
| 2003/0098596 A1 | 5/2003 | Andreasson et al. |

\* cited by examiner

*Primary Examiner*—Milton Nelson, Jr.
(74) *Attorney, Agent, or Firm*—Brooks Kushman P.C.

(57) ABSTRACT

A seat assembly includes a seat back that is pivotable from an upright use position to a stowed position. A head restraint includes first and second portions, each of which are movable from a respective upright use position to a respective stowed position. Each of the portions includes a respective contact surface for contacting an occupant of the seat assembly. A release mechanism is configured to facilitate movement of the first and second portions from their respective upright use positions to their respective stowed positions. An automatic return mechanism is provided to automatically return the first and second portions from their respective stowed positions to their respective upright use positions when the seat back is pivoted from its stowed position to its upright use position.

20 Claims, 7 Drawing Sheets

SEAT ASSEMBLY WITH FOLDING HEAD RESTRAINT AND METHOD FOR FOLDING SAME

BACKGROUND OF THE INVENTION

1. Field of the Invention

The present invention relates to a seat assembly with a folding head restraint, and a method for folding the seat assembly.

2. Background Art

Many vehicles today include seat assemblies that fold down to provide increased cargo area. In particular, the second and/or third row of a vehicle may include seats that kneel, fold and tumble to provide a flat surface on which to load cargo. One limitation of many of these seats is the need to remove the head restraint prior to folding the seat. The head restraint must then be stowed in some generally inconvenient location. For example, if the head restraint is stowed outside the vehicle, it may not be available when the seat is returned to its upright position. If the head restraint is stowed inside the vehicle, it may occupy a portion of the cargo space made available by folding the seat down; this reduces the utility of a fold-down seat. In either case, the head restraint might not be reinstalled into the seat assembly when it is returned to the upright position. Thus, a vehicle occupant may not have the head restraint available when it is needed.

Not all head restraints must be removed from a seat assembly when the seat assembly is folded down. Some head restraints can remain in the seat assembly; however, such designs have their own inherent limitations. For example, the height of the head restraint may be limited because of space considerations—i.e., when the seat back is folded down, a head restraint that is too tall may interfere with the seat directly in front of it, or it may interfere with the body of the vehicle. Moreover, even if a head restraint folds out of the way and remains with the seat assembly when the seat assembly is folded down, the head restraint may still require a manual operation to return it to its upright use position. Thus, a seat may be returned to its upright position with the head restraint still attached, but if the head restraint is not manually returned to its upright position, it may not be available to a seated occupant.

Therefore, a need exists for a seat assembly that includes a folding head restraint that includes at least two portions that can each be folded into a stowed position, thereby allowing the head restraint to remain attached to the seat assembly when the seat assembly is folded down.

SUMMARY OF THE INVENTION

Accordingly, the present invention provides a seat assembly including a head restraint that has two portions, each of which can be folded down into a stowed position so the head restraint can remain attached to the seat assembly when the seat is folded down, and thereby providing a taller seat assembly than a single-portion head restraint.

The present invention also provides a seat assembly having a head restraint that includes two pieces, each of which has a contact surface for contacting a seated occupant.

The invention further provides a seat assembly having a head restraint that can be folded down into a stowed position when the seat is folded down, and also provide an automatic return mechanism that automatically returns the head restraint to its upright use position when the seat is returned to its upright use position.

The invention also provides a seat assembly including a seat back that is pivotable from an upright use position to a stowed position. A head restraint includes first and second portions. Each of the portions are movable from a respective upright use position to a respective stowed position. Each of the portions includes a respective contact surface for contacting an occupant of the seat assembly. A release mechanism is configured to facilitate movement of the first and second portions from their respective upright use positions to their respective stowed positions.

The invention further provides a seat assembly including a seat back that is pivotable from an upright use position to a stowed position. A head restraint includes first and second portions, each of which is movable from a respective upright use position to a respective stowed position. A release mechanism is configured to facilitate movement of the first and second portions from their respective upright use positions to their respective stowed positions. An automatic return mechanism is configured to automatically return the first and second portions from their respective stowed positions to their respective upright use positions when the seat back is pivoted from its stowed position to its upright use position.

The invention also provides a method for folding a seat assembly having a seat back pivotable from an upright use position to a stowed position. The seat assembly also includes a head restraint including first and second portions, each of which includes a respective contact surface for contacting an occupant of the seat assembly. The method includes pivoting the seat back forward, and folding the first portion of the head restraint from an upright use position to a stowed position. This rotates the contact surface of the first portion from a forward-facing position to a non-forward-facing position. The second portion of the head restraint is also folded from an upright use position to a stowed position. This rotates the contact surface of the second portion from a forward-facing position to a non-forward-facing position.

DETAILED DESCRIPTION OF THE PREFERRED EMBODIMENT(S)

Figure 1:
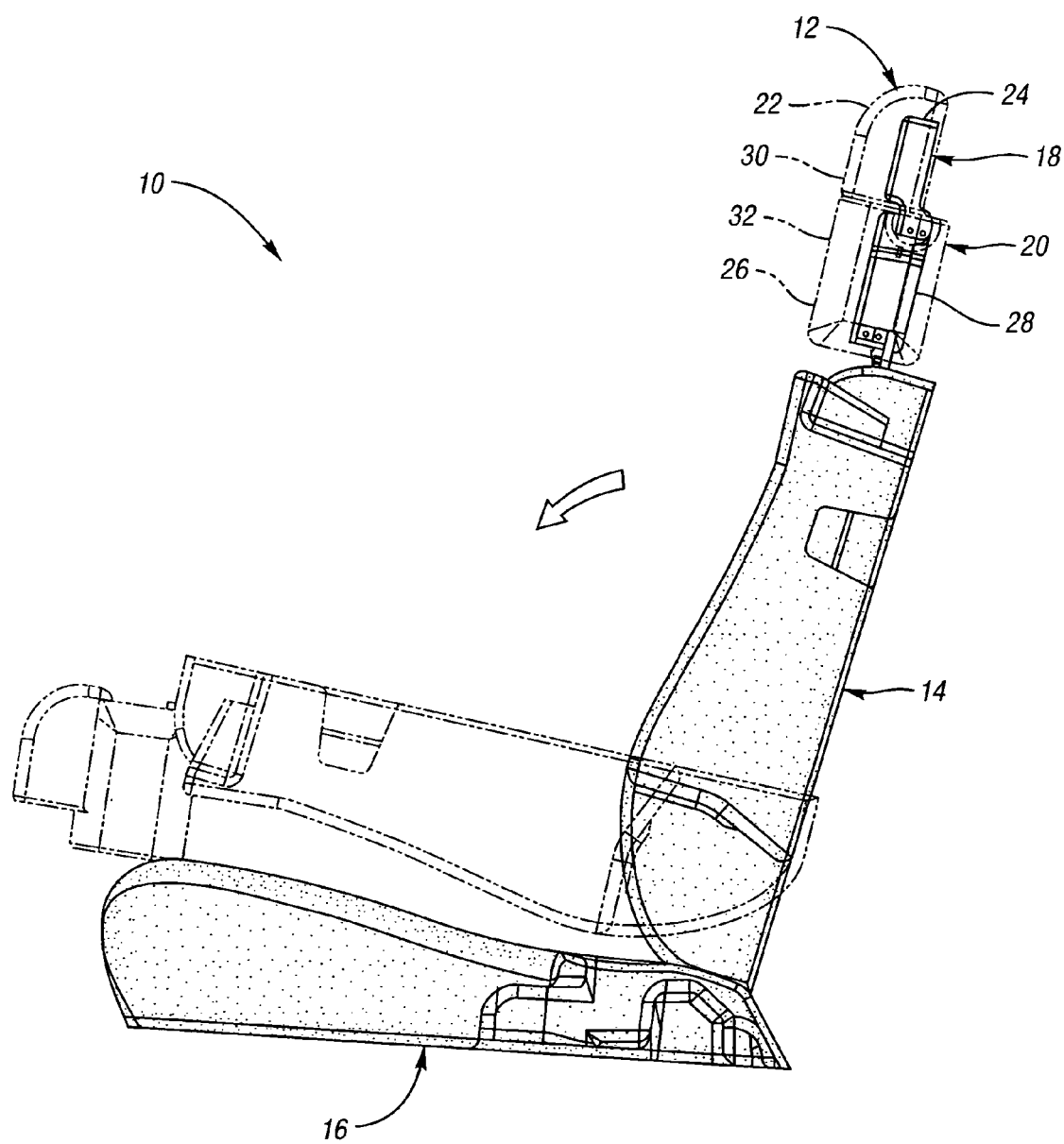
FIG. 1 is a perspective view of a portion of a seat assembly in accordance with the present invention.

FIG. 1 shows a portion of a seat assembly 10 in accordance with the present invention. The seat assembly 10 includes a head restraint 12, a seat back 14, and a seat portion 16. As shown in FIG. 1, the seat back 14 is pivotable from an upright use position, shown by solid lines, to a stowed position, shown in phantom. The head restraint 12 includes first and second portions 18,20. The first portion 18 includes padding material 22 which surrounds a frame 24. Similarly, the second portion 20 includes padding material 26 which surrounds a frame 28. The padding 22,26 respectively forms a contact surface 30 on the first portion 18, and a contact surface 32 on the second portion 20. Each contact surface 30,32 is configured to contact an occupant of the seat assembly 10. Of course, at any given time, only one of the contact surfaces 30,32, or neither of them, may actually be in contact with the seated occupant. In fact, the height of the seated occupant, as well as the position of the seat portion 16, may effect whether one or both of the contact surfaces 30,32 are actually in contact with the seated occupant.

Figure 2:
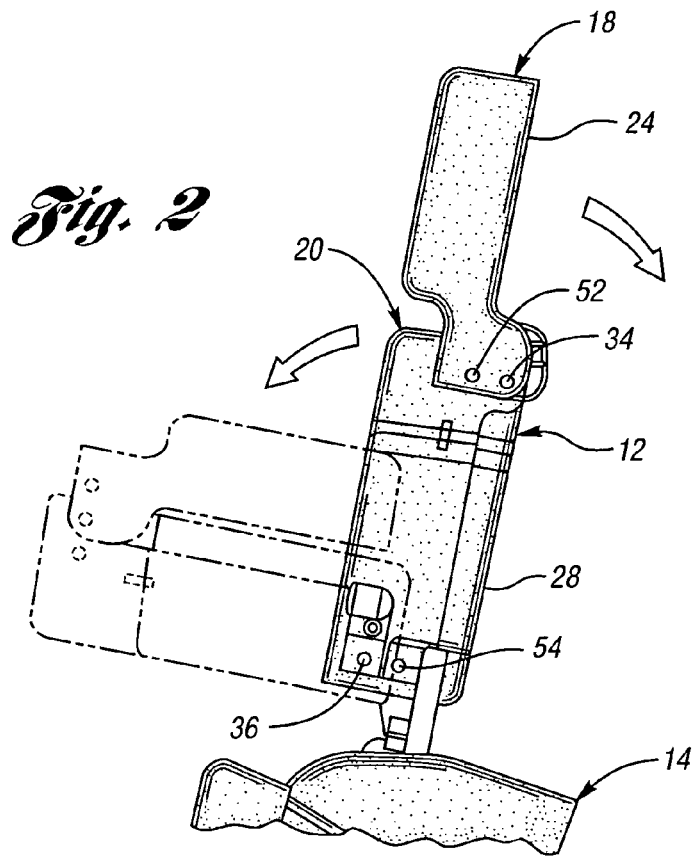
FIG. 2 is a side plan view of a head restraint shown in FIG. 1.

The head restraint 12 is configured so that each of the first and second portions 18,20 are movable from a respective upright use position to a respective stowed position. This is illustrated in FIG. 2 where the padding material 22,26 has been removed from the frames 24,28 for clarity. As shown in solid lines in FIG. 2, when the first and second portions 18,20 are in their respective upright use positions, the first portion 18 is disposed above the second portion 20. This configuration provides for a tall seat assembly which can be beneficial to a seated occupant; however, because each of the first and second portions 18,20 fold to a respective stowed position, the head restraint 12 need not be removed from the seat assembly 10 when the seat back 14 is folded forward to its stowed position.

As shown by the directional arrows in FIG. 2, the first portion 18 folds backward, pivoting on a first rod 34. In contrast, the second portion 20 folds forward, pivoting on a second rod 36. Having the second portion 20 fold forward instead of backward helps to ensure that an occupant will not attempt to be seated while the head restraint 12 is in its stowed position. The forward position of the head restraint 12—i.e., when it is in its stowed position—forwardly displaces an occupant's torso, thereby making it obvious to the occupant that the head restraint 12 is not in its upright use position. Alternatively, the first and second portions 18,20 can both be configured to fold backward, and if desired, nest into a portion of the seat back 14. The seat assembly 10 can be configured such that the head restraint 12 folds into its stowed position automatically when the seat back 14 is folded into its stowed position. The seat assembly 10 can also be configured such that the head restraint 12 can be manually placed in its stowed position without the seat back 14 being folded down. This may be desirable to increase visibility when there is no occupant in the seat assembly 10. In addition, the seat assembly 10 can be configured such that either one of the first and second portions 18, 20 can be folded down individually, without the seat back 14 being folded down.

Figure 3:
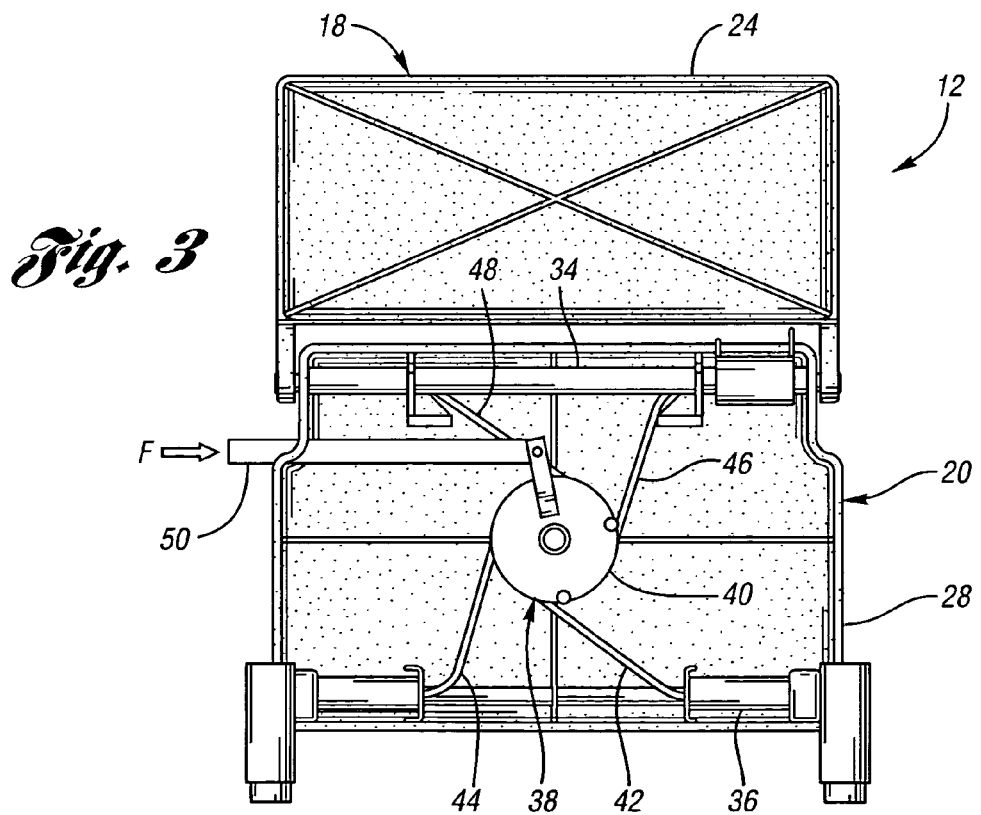
FIG. 3 is a back plan view of the head restraint shown in FIG. 2, including a release mechanism.

FIG. 3 shows a portion of the head restraint 12, including a release mechanism 38. The release mechanism 38 is configured to facilitate movement of the first and second portions 18,20 from their respective upright use positions to their respective stowed positions. The release mechanism 38 includes a pulley 40 and a plurality of cables 42,44,46,48. In the embodiment shown in FIG. 3, the release mechanism 38 is configured to be manually actuated, independently from the pivoting of the seat back 14. In particular, application of a force (F) on a link 50 rotates the pulley 40, thereby tensioning the cables 42,44,46,48. When installed in the seat assembly 10, the link 50 can be connected to a button, or other actuating device, on the side or back of the head restraint 12. As explained more fully below, moving the link 50, which tensions the cables 42,44,46,48, moves four corresponding pins (not visible in FIG. 3), which in turn releases the first and second portions 18,20 from their respective upright use positions.

Returning to FIG. 2, one of the pins 52 is shown adjacent the first rod 34. It is understood that another pin is located on the opposite side of the first portion 18, and that together these pins maintain the first portion 18 in its upright use position. Similarly, a pin 54, and another pin on the opposite side of the second portion 20, maintain the second portion 20 in its upright use position.

Figure 4:
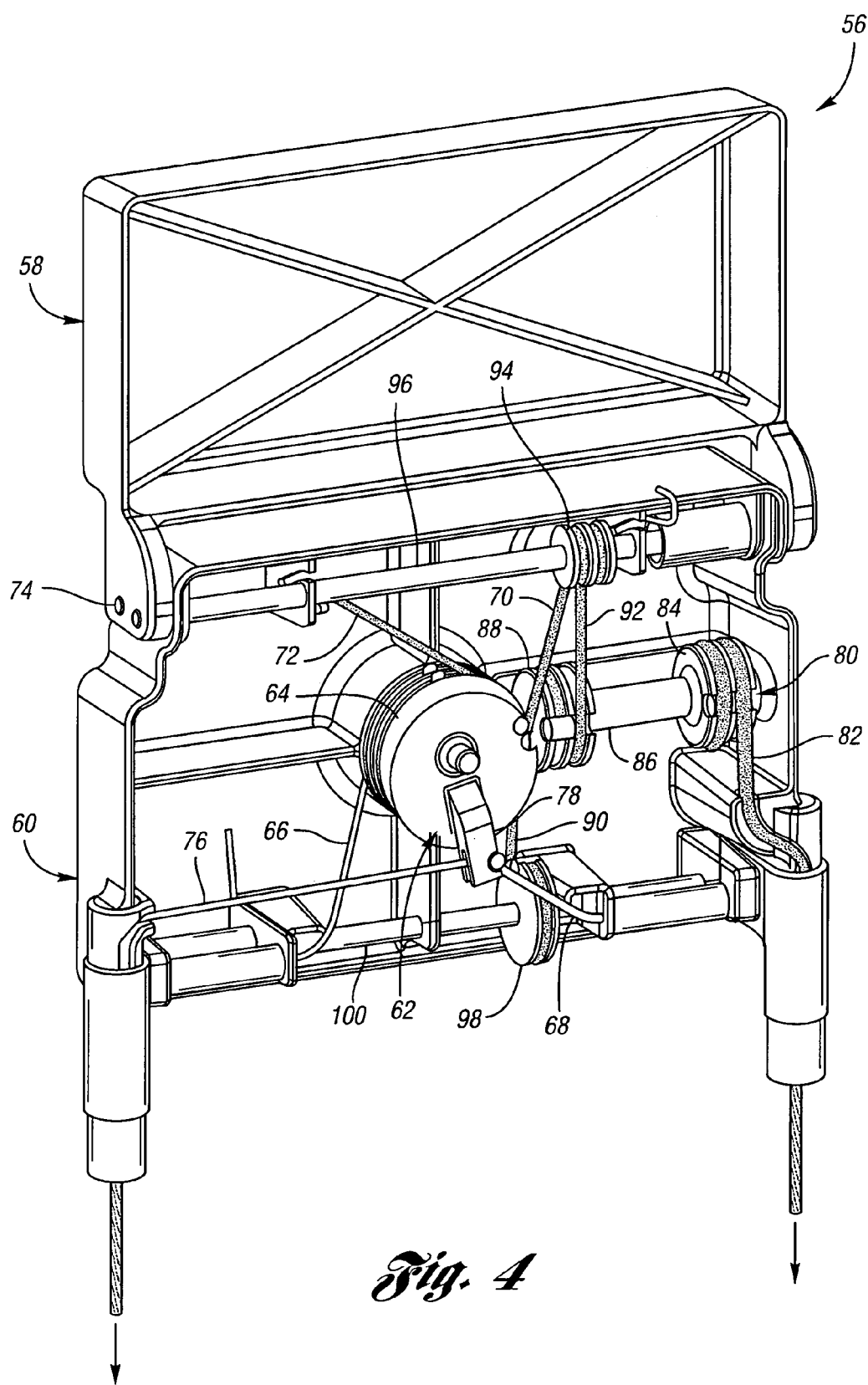
FIG. 4 is a perspective view of a first alternative embodiment of a head restraint, including a release mechanism and an automatic return mechanism.

As noted above, a head restraint, such as the head restraint 12, can be configured with a release mechanism that is actuated when the seat back of a seat assembly is pivoted from its upright use position to its stowed position. A portion of such a head restraint 56 is shown in FIG. 4. The head restraint 56 includes first and second portions 58,60. Similar to the head restraint 12, the head restraint 56 also includes a release mechanism 62 having a pulley 64. The release mechanism 62 also includes cables 66,68,70,72, which actuate corresponding pins, only one of which, pin 74, is visible in FIG. 4. Unlike the release mechanism 38 shown in FIG. 3, the release mechanism 62 is actuated when a seat back is pivoted from its upright use position to its stowed position. This is effected by the use of a cable 76, which has one end connected to a bracket 78 on the pulley 64, and another end connected to a portion of the seat assembly (not shown). In this configuration, pivoting the seat back forward tensions the cable 76, which rotates the pulley 64, which causes the four pins, including the pin 74, to move linearly, thereby releasing the first and second portions 58,60 from their respective upright use positions.

The head restraint 56 also includes an automatic return mechanism 80. The automatic return mechanism 80 is configured to automatically return the first and second portions 58,60 to their respective upright use positions when the seat back is pivoted from its stowed position to its upright use position. The automatic return mechanism 80 includes a cable 82, having one end attached to a pulley 84. The other end of the cable 82 is connected inside the seat, in a similar fashion to the cable 76. When the seat back is returned from its stowed position to its upright use position, the cable 82 is tensioned, which rotates the pulley 84. This, in turn, rotates a shaft 86 and pulley 88, which tensions cables 90,92. When the cable 92 is tensioned, it rotates a pulley 94 and a first rod 96. The first portion 58 of the head restraint 56 is pivotable on the first rod 96, so that as the first rod 96 rotates so does the first portion 58. Similarly, tensioning the cable 90 rotates a pulley 98 and a second rod 100. The second portion 60 is pivotable on the second rod 100 such, that as the second rod 100 rotates, the second portion 60 also rotates.

Figure 5:
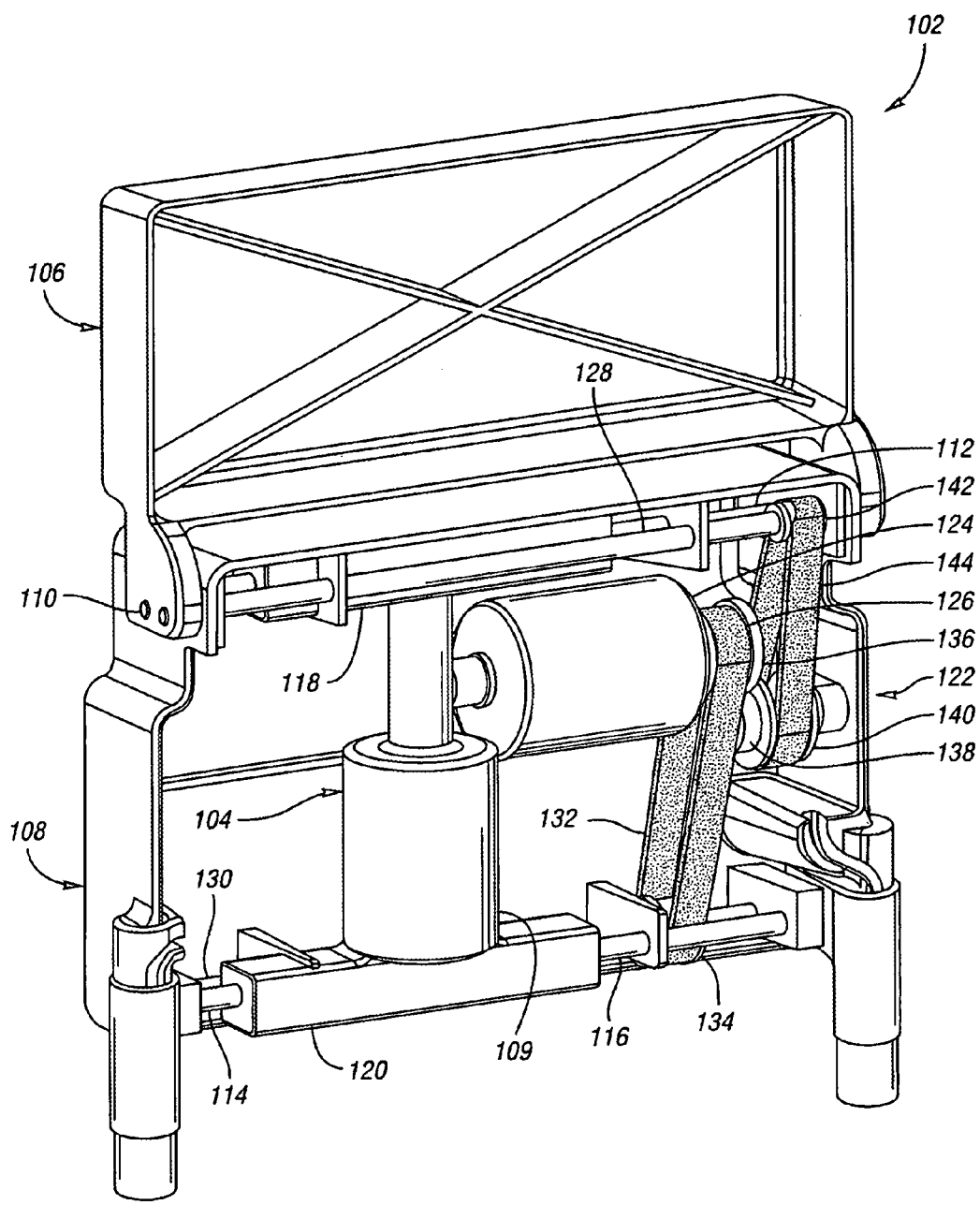
FIG. 5 is a perspective view of a second alternative embodiment of a head restraint, including a motorized release mechanism and a motorized automatic return mechanism.

FIG. 5 shows a head restraint 102 that is configured for motorized operation. In particular, a release mechanism 104 includes an electric motor 109 which can be used to release first and second portions 106,108 of the head restraint 102 from their respective upright use positions. The head restraint 102 includes pins 110,112 which maintain the first portion 106 in its upright use position, and pins 114,116 which maintain the second portion 108 in its upright use position. The motor 109 is operatively connected to the pins 110,112 through a gear box 118, and to the pins 114,116 through a gear box 120. The head restraint 102 can be configured such that the motor 109 is actuated when the seat back is moved forward from its upright use position to its stowed position. In addition, the motor 109 can be configured to be actuated by a switch disposed at any convenient location inside a vehicle, such as on an instrument panel. Alternatively, the motor 109 can be configured to be remotely actuated, for example, by pressing a button on a key fob.

The head restraint 102 also includes an automatic return mechanism 122. The automatic return mechanism 122 includes an electric motor 124 which is connected to a pulley 126. The first portion 106 is pivotable on a first rod 128, and the second portion 108 is pivotable on a second rod 130. As the motor 124 rotates the pulley 126, a belt 132 rotates another pulley 134. The pulley 134 is connected to the second rod 130, such that as it rotates, the second portion 108 is rotated from its stowed position to its upright use position.

Through the use of gears 136,138, pulleys 140,142, and belt 144, rotation of the motor 124 also rotates the first rod 128. This brings the first portion 106 from its stowed position to its upright use position. The head restraint 102 can be configured such that movement of the seat back from its stowed position to its upright use position actuates the motor 124 to automatically return the first and second portions 106,108 to their respective upright use positions.

Figure 6:
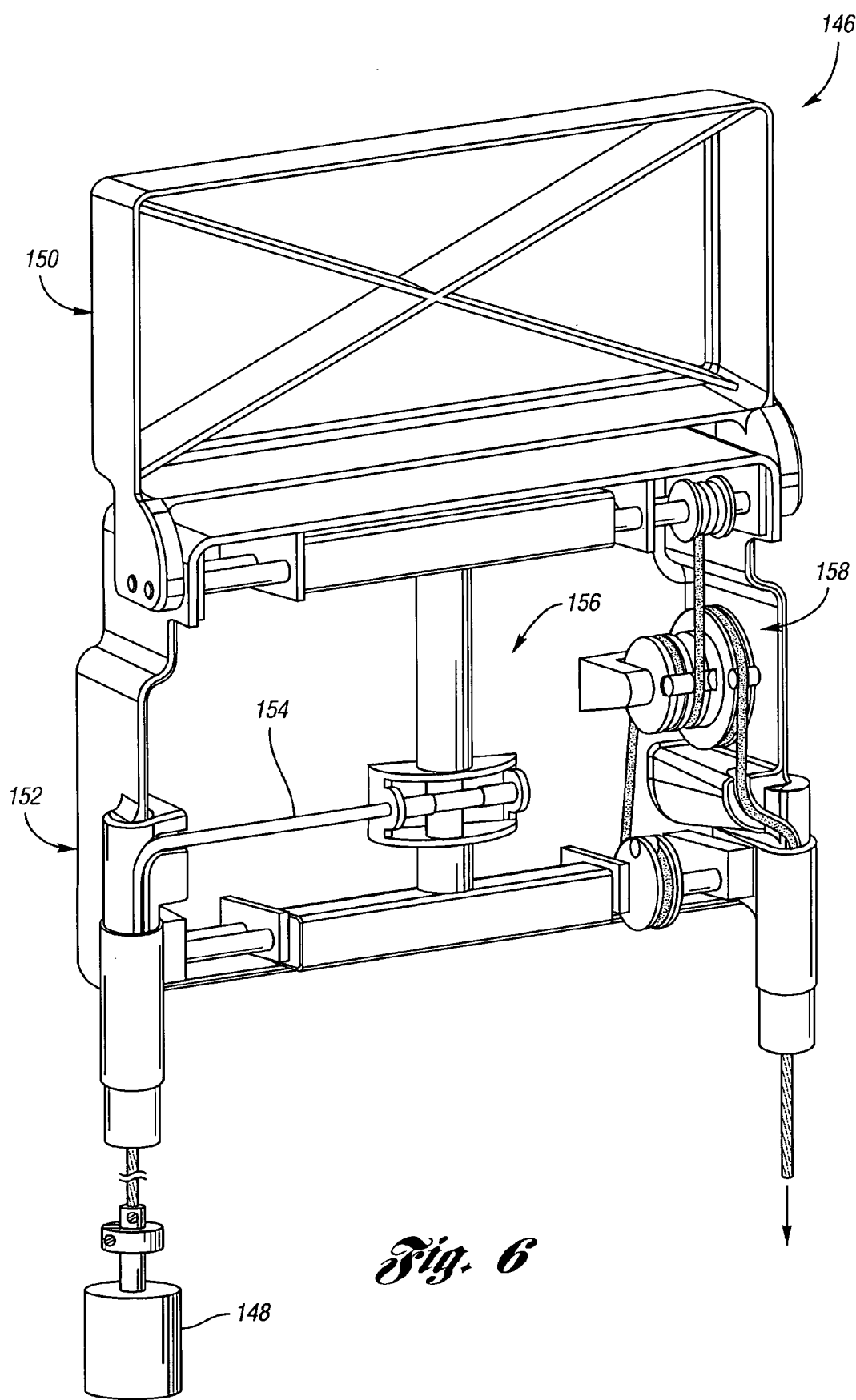
FIG. 6 is a perspective view of a third alternative embodiment of a head restraint, including an automatic return mechanism, and a release mechanism that utilizes a remote motor.

FIG. 6 shows a head restraint 146 that includes an electric motor 148 that is remotely located outside of first and second head restraint portions 150,152. A remote motor, such as the motor 148, may be disposed in any convenient location, such as in or on a seat assembly. The head restraint 146 uses a flexible shaft 154 which is rotated by the motor 148. The flexible shaft 154 is operatively connected to a gear arrangement, shown generally at 156. Similar to the gear boxes 118,120, shown in FIG. 5, the gear arrangement 156 transfers rotational motion of the motor 148 into linear motion of a set of pins. Similar to other embodiments, the pins maintain the first and second portions 150,152 in their respective upright use positions. As in the embodiment shown in FIG. 5, the motor 148 can be actuated when a seat back is folded down from its upright use position to its stowed position. Similarly, a remotely located switch within a vehicle or on a switch in a key fob could also be used to actuate the motor 148. The head restraint 146 also includes an automatic return mechanism 158, that is configured similarly to the automatic return mechanism shown in FIG. 4.

Figure 7:
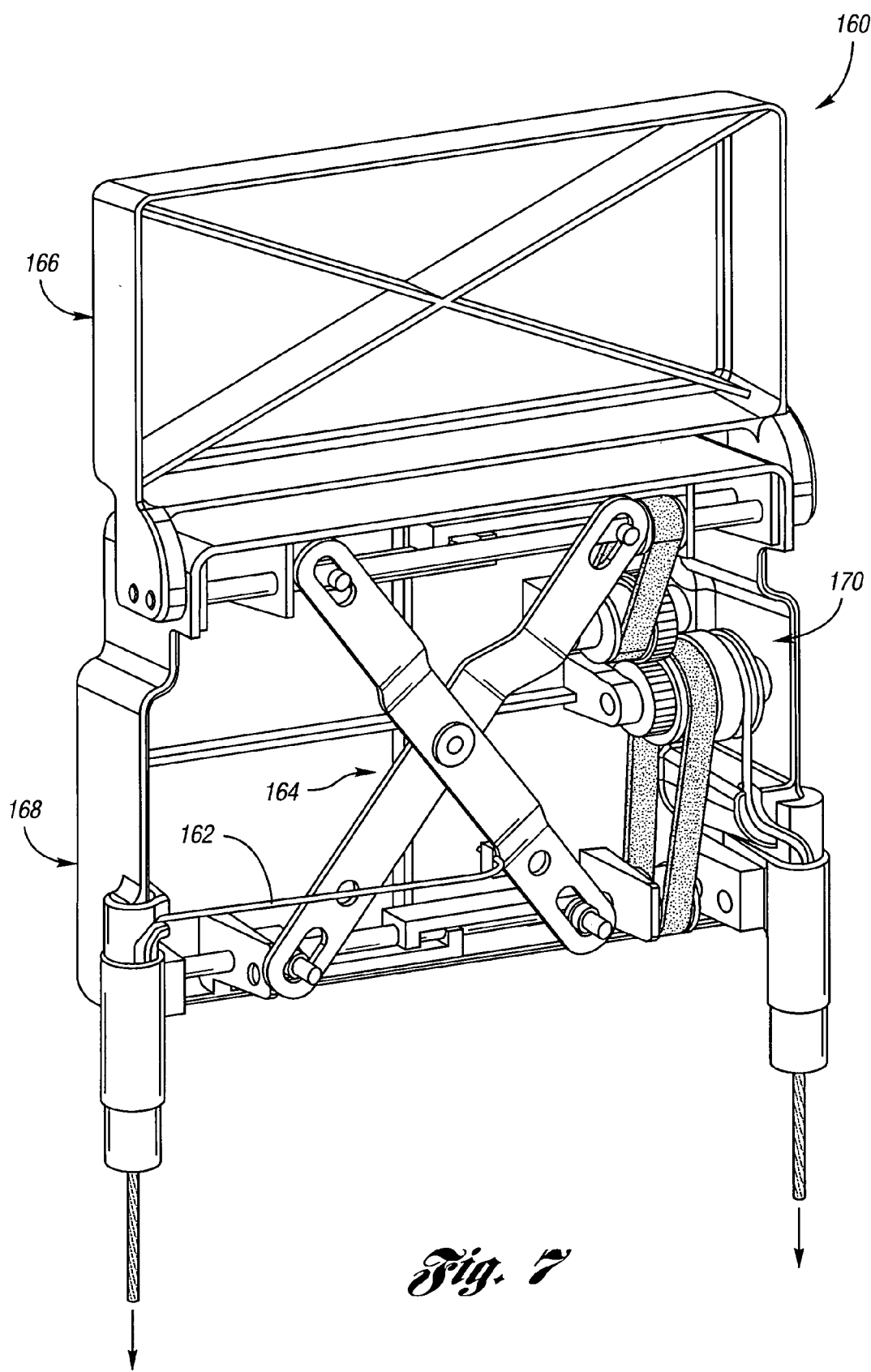
FIG. 7 is a perspective view of a fourth alternative embodiment of a head restraint, including an automatic return mechanism, and a release mechanism that utilizes a cable and link configuration.

FIG. 7 shows a head restraint 160 having some of the features of embodiments discussed above. For example, a cable 162 has one end connected to a portion of a seat assembly, such that the cable 162 is tensioned when the seat back is folded forward from its upright use position to its stowed position. Tensioning the cable 162 actuates a link mechanism 164, which moves pins to release first and second head restraint portions 166,168 in a fashion similar to the embodiments described above. In addition, the head restraint 160 includes an automatic return mechanism 170 that combines a cable actuation mechanism similar to the embodiment shown in FIG. 4, with a belt and pulley system similar to the embodiment shown in FIG. 5. It is worth noting that a return mechanism, such as the return mechanism 170, is not limited to belt and pulley systems, but may, for example, include chain drives, direct gear drives, or other motion transfer systems.

Figure 8:
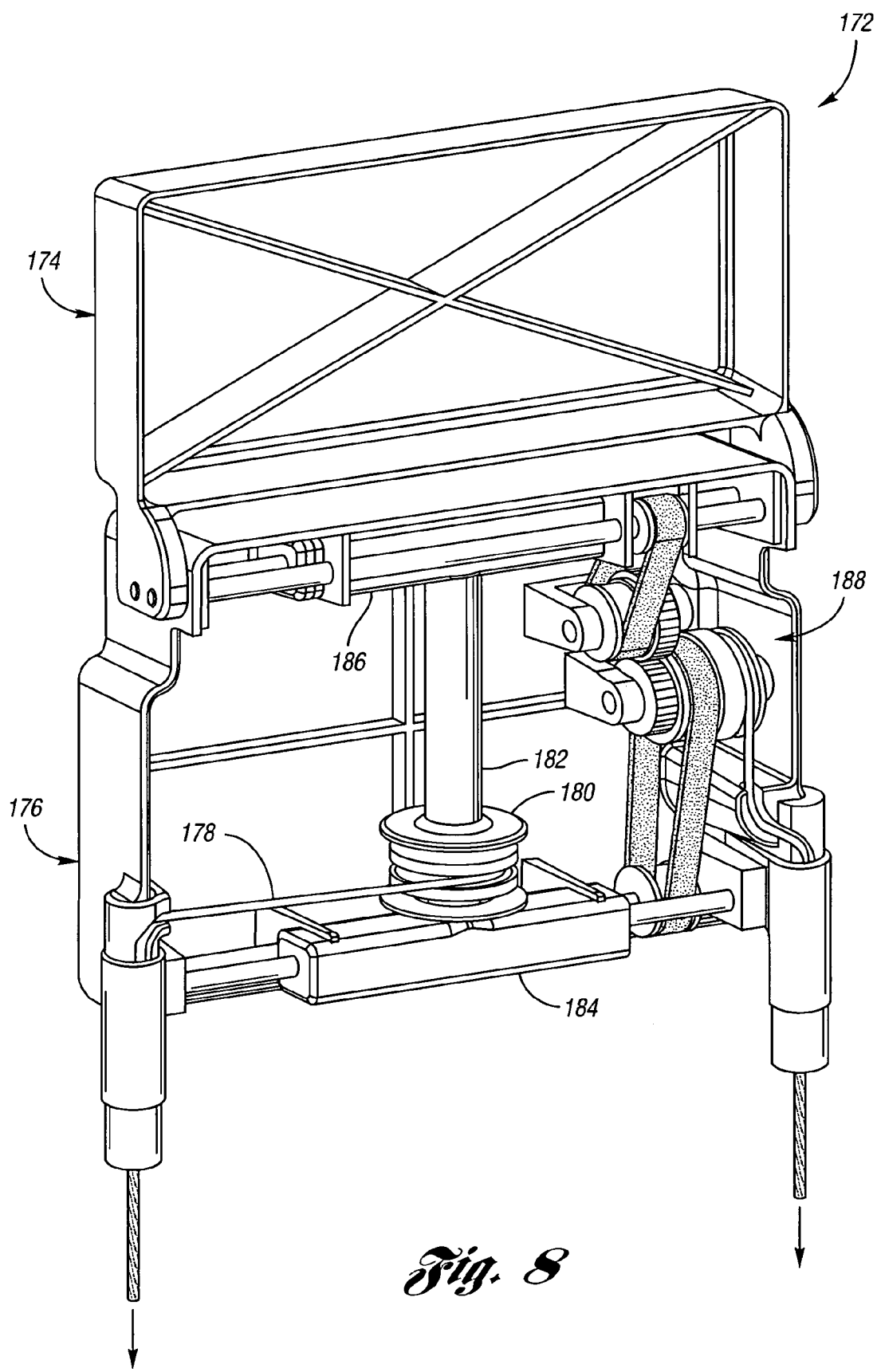
FIG. 8 is a perspective view of a fifth alternative embodiment of a head restraint in accordance with the present invention.

FIG. 8 shows a head restraint 172 including first and second portions 174,176. The head restraint 172 includes a cable 178 which is tensioned when the seat back is folded from its upright use position to its stowed position. Tensioning the cable 178 rotates a pulley 180 and a shaft 182 which is operatively connected to gear boxes 184,186. Similar to the gear boxes 118,120, shown in FIG. 5, the gear boxes 184,186 transfer rotational motion of the shaft 182 into linear motion to release the pins which maintain the first and second portions 174,176 in their respective upright use positions. The head restraint 172 also includes an automatic return mechanism 188 that is configured like the automatic return mechanism illustrated and described in FIG. 7.

As described above, the various embodiments illustrated in the drawing figures provide a number of mechanisms for folding a seat assembly from an upright use position to a stowed position. In practice, a vehicle occupant may move the seat back forward, while at the same time folding first and second head restraint portions from their respective upright use positions to their respective stowed positions. As described above, the release of the first and second head restraint portions may be effected automatically when the seat back is folded forward. Alternatively, a vehicle occupant could maintain the seat back in its upright use position, while folding the first and second head restraint portions into their respective stowed positions to provide increased visibility. In addition, when the seat back is folded forward into its stowed position, any of a number of automatic return mechanisms can be used with the head restraint such that the first and second head restraint portions automatically return to their respective upright use positions when the seat back is returned to its upright use position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly, comprising:
    a seat back;
    a head restraint including first and second portions, each of the portions being movable from a respective upright use position to a respective stowed position, at least one of the portions being movable relative to the other one of the portions, and each of the portions including a respective contact surface for contacting an occupant of the seat assembly the first and second portions being disposed in an over/under relationship when they are in their respective upright use positions; and
    a release mechanism configured to facilitate movement of the first and second portions from their respective upright use positions to their respective stowed positions.

2. The seat assembly of claim 1, wherein each of the first and second portions includes padding material disposed thereon, some of the padding material forming the contact surface of the first portion, and some of the padding material forming the contact surface of the second portion.

3. The seat assembly of claim 1, wherein the seat back is pivotable from an upright use position to a stowed position, and the release mechanism is configured to be actuated independently from the seat back pivoting.

4. The seat assembly of claim 1, further comprising at least one pin for maintaining the first portion in its upright use position and at least one pin for maintaining the second portion in its upright use position, and wherein the release mechanism includes at least one cable configured to facilitate linear movement of the pins, thereby releasing the first and second portions from their respective upright use positions.

5. The seat assembly of claim 1, further comprising at least one pin for maintaining the first portion in its upright use position and at least one pin for maintaining the second portion in its upright use position, and wherein the release mechanism includes at least one electric motor configured to facilitate linear movement of the pins, thereby releasing the first and second portions from their respective upright use positions.

6. The seat assembly of claim 5, wherein the at least one electric motor includes a remote motor disposed outside the first and second portions, and the release mechanism further includes a flexible shaft at least partially disposed within the second portion, the remote motor being operatively connected to the flexible shaft for rotating the flexible shaft, thereby effecting a linear movement of the pins.

7. The seat assembly of claim 1, wherein the seat back is pivotable from an upright use position to a stowed position, and the release mechanism is actuated when the seat back is pivoted from its upright use position to its stowed position, thereby effecting movement of the first and second portions from their respective upright use positions to their respective stowed positions.

8. The seat assembly of claim 7, further comprising an automatic return mechanism configured to automatically return the first and second portions from their respective stowed positions to their respective upright use positions when the seat back is pivoted from its stowed position to its upright use position.

9. The seat assembly of claim 8, wherein the first portion is pivotable on a first rod and the second portion is pivotable on a second rod, and wherein the automatic return mechanism includes a pulley and a cable, the pulley being operatively connected to the first and second rods and disposed within the second portion, the cable being operatively connected to the pulley such that pivoting the seat back from its stowed position to its upright use position tensions the cable and rotates the pulley, thereby rotating the first and second rods and pivoting the first and second portions from their respective stowed positions to their respective upright use positions.

10. The seat assembly of claim 8, wherein the first portion is pivotable on a first rod and the second portion is pivotable on a second rod, and wherein the automatic return mechanism includes a pulley operatively connected to the first and second rods and an electric motor operatively connected to the pulley such that pivoting the seat back from its stowed position to its upright use position actuates the motor, thereby rotating the pulley and the first and second rods and pivoting the first and second portions from their respective stowed positions to their respective upright use positions.

11. A seat assembly, comprising:
a seat back pivotable from an upright use position to a stowed position;
a head restraint including first and second portions, each of the portions being movable from a respective upright use position to a respective stowed position, at least one of the portions being movable relative to the other one of the portions;
a release mechanism configured to facilitate movement of the first and second portions from their respective upright use positions to their respective stowed positions; and
an automatic return mechanism configured to automatically return the first and second portions from their respective stowed positions to their respective upright use positions when the seat back is pivoted from its stowed position to its upright use position.

12. The seat assembly of claim 11, wherein the release mechanism is configured to be actuated independently from the seat back pivoting.

13. The seat assembly of claim 11, further comprising at least one pin for maintaining the first portion in its upright use position and at least one pin for maintaining the second portion in its upright use position, and wherein the release mechanism includes at least one cable configured to facilitate linear movement of the pins, thereby releasing the first and second portions from their respective upright use positions.

14. The seat assembly of claim 11, wherein the release mechanism is actuated when the seat back is pivoted from its upright use position to its stowed position, thereby effecting movement of the first and second portions from their respective upright use positions to their respective stowed positions.

15. The seat assembly of claim 11, wherein the first portion is pivotable on a first rod and the second portion is pivotable on a second rod, and wherein the automatic return mechanism includes a pulley and a cable, the pulley being operatively connected to the first and second rods and disposed within the second portion, the cable being operatively connected to the pulley such that pivoting the seat back from its stowed position to its upright use position tensions the cable and rotates the pulley, thereby rotating the first and second rods and pivoting the first and second portions from their respective stowed positions to their respective upright use positions.

16. The seat assembly of claim 11, wherein the first portion is pivotable on a first rod and the second portion is pivotable on a second rod, and wherein the automatic return mechanism includes a pulley operatively connected to the first and second rods and an electric motor operatively connected to the pulley such that pivoting the seat back from its stowed position to its upright use position actuates the motor, thereby rotating the pulley and the first and second rods and pivoting the first and second portions from their respective stowed positions to their respective upright use positions.

17. The seat assembly of claim 11, further comprising at least one pin for maintaining the first portion in its upright use position and at least one pin for maintaining the second portion in its upright use position, and wherein the release mechanism includes at least one electric motor configured to facilitate linear movement of the pins, thereby releasing the first and second portions from their respective upright use positions.

18. The seat assembly of claim 17, wherein the at least one electric motor includes a remote motor disposed outside the first and second portions, and the release mechanism further includes a flexible shaft at least partially disposed within the second portion, the remote motor being operatively connected to the flexible shaft for rotating the flexible shaft, thereby effecting a linear movement of the pins.

19. A method for folding a seat assembly having a seat back and a head restraint including first and second portions, each of the portions including a respective contact surface for contacting an occupant of the seat assembly, the method comprising:
pivoting the seat back from an upright use position to a stowed position;

automatically folding the first portion of the head restraint from an upright use position to a stowed position, thereby rotating the contacts surface of the first portion from a forward-facing position to a non-forward position when the seat back is pivoted from its upright use position to its stowed position; and automatically folding the second portion of the head restraint from an upright use position to a stowed position, thereby rotating the contacts surface of the second portion from a forward facing position to a non-forward position when the seat back is pivoted from its upright use position to its stowed position.

20. A seat assembly, comprising:

a seat back;

a head restraint including first and second portions, each of the portions being movable from a respective upright use position to a respective stowed position, at least one of the portions being movable relative to the other one of the portions, and each of the portions including a respective contact surface for contacting an occupant of the seat assembly;

at least one pin for maintaining the first portion in its upright use position;

at least one pin for maintaining the second portion in its upright use position; and a release mechanism configured to facilitate movement of the first and second portions from their respective upright use positions to their respective stowed positions, the release mechanism including at least one electric motor configured to facilitate linear movement of the pins, thereby releasing the first and second portions from their respective upright use positions.

* * * * *